United States Patent [19]
Hashimoto

[11] Patent Number: 5,793,863
[45] Date of Patent: Aug. 11, 1998

[54] TELEPHONE HAVING A SPEECH BAND LIMITING FUNCTION

[75] Inventor: Kazuya Hashimoto, Tokyo, Japan

[73] Assignee: NEC Corporation, Tokyo, Japan

[21] Appl. No.: 410,705

[22] Filed: Mar. 27, 1995

[30] Foreign Application Priority Data

Mar. 25, 1994 [JP] Japan .................................. 6-077891

[51] Int. Cl.$^6$ .......................... H04M 11/00; H03B 29/00
[52] U.S. Cl. .................. 379/387; 379/360; 381/71.1; 381/94.1; 455/422; 455/425
[58] Field of Search .................. 379/387, 56, 58, 379/61, 389, 390, 392, 406, 407, 411; 381/46, 43, 94, 57, 71; 455/31.1, 33.1, 33.2, 422, 425

[56] References Cited

U.S. PATENT DOCUMENTS

| | | | |
|---|---|---|---|
| 5,201,004 | 4/1993 | Fujiwara et al. | 381/46 |
| 5,432,859 | 7/1995 | Yang et al. | 381/94 |
| 5,640,685 | 6/1997 | Komoda | 455/72 |

FOREIGN PATENT DOCUMENTS

| | | |
|---|---|---|
| 0 222 083 | 5/1987 | European Pat. Off. . |
| 0 343 792 | 11/1989 | European Pat. Off. . |
| 0343792 | 11/1989 | European Pat. Off. . |
| 0 477 158 | 3/1992 | European Pat. Off. . |
| 1-123554 | 5/1989 | Japan . |
| WO 9306679 | 4/1993 | WIPO . |

*Primary Examiner*—Fan S. Tsang
*Assistant Examiner*—Jacques M. Saint-Surin
*Attorney, Agent, or Firm*—Scully, Scott, Murphy & Presser

[57] ABSTRACT

In a telephone, a speech band switching circuit selectively provides a received speech with one of a plurality of frequency characteristics. A sensing circuit senses the level of noise around the telephone. A speech band control circuit compares the noise level sensed by the sensing circuit with a predetermined level and controls the speech band switching circuit on the basis of the result of comparison. When the noise level is higher than the predetermined level, the control circuit sends a control signal to the switching circuit. In response, the switching circuit selects a high-pass filter in place of a low-pass filter. As a result, a received speech is easy to hear despite the noise around the telephone because the low frequency range thereof is filtered out.

4 Claims, 2 Drawing Sheets

TELEPHONE HAVING A SPEECH BAND LIMITING FUNCTION

BACKGROUND OF THE INVENTION

The present invention relates to a telephone capable of limiting a band-width of a received speech signal and, more particularly, to a mobile telephone capable of making a received speech easy to hear even in a noisy environment.

It has been customary with a telephone to include a filter for limiting a band-width of a received speech signal in a receiver circuit thereof. The filter limits a received speech signal to a predetermined frequency band and thereby makes the speech easy to hear. Specifically, the telephone has a casing and a transmitter (microphone) and a receiver (speaker) mounted on the casing. A radio section demodulates a signal coming in through an antenna. The filter mentioned above controls the frequency band of the output of the radio section. The radio section and filter are connected to the receiver. In this configuration, the demodulated signal from the radio section has the frequency band thereof limited by the filter, so that a speech signal is output from the receiver within the limited frequency band. Usually, the filter is of the kind filtering out a low frequency component in order to make a received speech easy to hear.

Various approaches have recently been proposed to improve the quality of speeches received on a telephone. One of them is to provide the filter with a characteristic which enhances a low frequency component by filtering out a high frequency component. Specifically, when a high frequency component is enhanced to promote easy hearing, a received speech sounds metallic and annoys the user of the telephone. In contrast, the filter of the kind filtering out a high frequency component allows a received speech to sound soft, thereby improving the speech quality. Another approach is to allow the user to adjust the frequency of a received speech on the telephone, i.e., the easiness of hearing, as taught in Japanese Patent Laid-Open Publication No. 1-123554 (document 1) by way of example.

However, the telephone with any of the conventional implementations for improving speech quality has the following problem. Assume that the telephone is used in a noisy urban environment outside of a building. Then, because city noises are generally distributed in a low frequency component, they are superposed on a speech signal whose frequency is limited to a low frequency component. The resulting speech output from the receiver is extremely hard to hear. For this reason, it has been customary to limit received speeches to a high frequency band so as to promote easy hearing, rather than to improve the speech quality in consideration of operation in noisy environments.

The telephone taught in the above document 1 promotes easy hearing because it allows the frequency characteristic of a received speech to be adjusted in matching relation to the environment. However, the adjustment is done by hand and, therefore, forces the user to manipulate the telephone while conversing with the other party. Moreover, it is likely that noise drowns out a speech due to inadequate adjustment and shuts off communication for a moment.

SUMMARY OF THE INVENTION

It is, therefore, an object of the present invention to provide a mobile telephone capable of improving the quality of a received speech and, in addition, promoting easy hearing of the speech even in a noisy urban environment.

It is another object of the present invention to provide a mobile telephone capable of improving the quality of a received speech and promoting easy hearing in a noisy environment by automatically changing the frequency band of the speech in matching relation to the noise level.

It is a further object of the present invention to provide a mobile telephone which is adjustable to an easy-to-hear condition at all times without resorting to manual operation.

A telephone of the present invention has a speech band switching circuit for selectively providing a received speech with one of a plurality of frequency characteristics. A sensing circuit senses a noise level. A speech band control circuit compares the noise level sensed by the sensing circuit with a predetermined level, and controls the speech band switching circuit on the basis of the result of comparison.

The speech band switching circuit may comprise a plurality of band-pass filters each for providing a received speech with a particular frequency characteristic, and selectors for selecting one of the band-pass filters at a time. The sensing circuit may comprise a microphone mounted on the casing of the telephone for sensing noise around the telephone.

The telephone having the above construction can automatically select the high frequency component or the low frequency component of a received speech on the basis of the surrounding noise level. When the noise level is high, the telephone ensures communication by promoting ease of hearing while sacrificing speech quality. For example, in a high noise level environment, the telephone selects the high-pass filter to filter out a low frequency component, thereby rendering a received speech easy to hear. In a low noise level environment, the telephone selects the low-pass filter so as to filter out a high frequency component and thereby causes a received speech to sound soft, i.e., improves speech quality. Further, the telephone of the present invention determines whether or not sound input to a transmitter is voice or noise on the basis of the level of the sound, and selectively enables or disenables the control circuit. The transmitter, therefore, plays the role of a noise detector at the same time.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENTS

Figure 1:
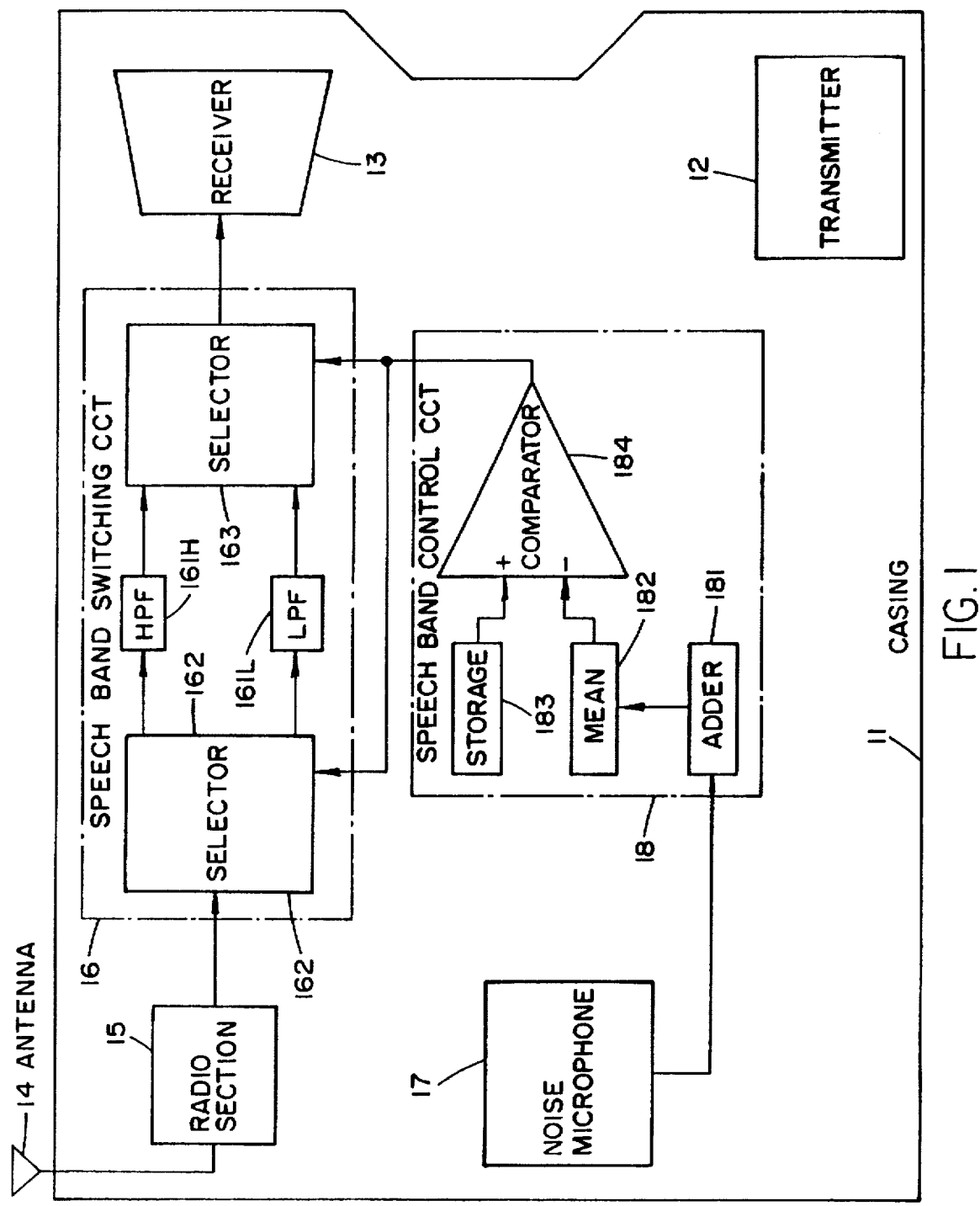
FIG. 1 is a block diagram schematically showing essential part of a mobile telephone embodying the present invention.

Referring to FIG. 1 of the drawings, a telephone embodying the present invention is shown and implemented as a portable telephone by way of example. The figure shows only part of the telephone which is relevant to the understanding of the present invention. As shown, the telephone has a casing 11 on which a transmitter or microphone 12 and a receiver or speaker 13 are mounted. An antenna 1 is connected to a radio section 15 which is, in turn, connected to the receiver 13 via a speech band switching circuit 16. A signal coming in through the antenna 14 is demodulated by the radio section 15 and then applied to the speech band switching circuit 16. The switching circuit 16 switches the frequency band characteristic of the demodulated signal. As a result, the receiver 13 outputs received voice in the speech band selected by the switching circuit 16.

The speech band switching circuit 16 has a plurality of band-pass filters 161 connected in parallel, and selectors 162 and 163 respectively connected to the inputs and the outputs of the filters 161. The selectors 162 and 163 select one of the filters 161 at a time and connect it to the radio section 15 and receiver 13. In the illustrative embodiment, the filters 161 are implemented as a high-pass filter (HPF) 161H and a low-pass filter (LPF) 161L for limiting the speech frequency to a high frequency band and a low frequency band, respectively. When the HPF 161H is selected, the high frequency components of the signal from the radio section 15 are passed through the HPF 151H and output as a speech signal via the receiver 13. The resulting voice, having the high frequency component thereof enhanced, is easy to hear. Conversely, when the LPF 161L is selected, the low frequency component of the speech signal is enhanced to improve the speech quality. The HPF 161H and LPF 161L may be implemented by filters customarily included in the tone control circuit of audio equipment.

The selectors 162 and 163 are switched by a control signal fed from a speech band control circuit 18 which will be described later. The selectors 162 and 163 are implemented by mechanical or electrical switches. In the illustrative embodiment, the selectors 162 and 163 select the HPF 161H when a digital control signal goes low or selects the LPF 161L when it goes high.

A microphone 17 is mounted on the rear of the casing 11 in order to sense the level of noise around the telephone. The microphone, or noise sense microphone, 17 is connected to the speech band control circuit 18 which generates the above-mentioned control signal. The speech band control circuit 18 is made up of an adder 181, a mean unit 182, a storage 183, and a comparator 184. The adder 181 adds consecutive noise signal levels sequentially sensed by the microphone 17. The mean unit 182 divides the output of the adder 181, i.e., the sum of the noise signal levels by time to produce a mean noise signal level. The storage 183 stores a predetermined reference noise signal level. The comparator 184 compares the mean noise signal level with the reference noise signal level stored in the storage 183. When the mean level is higher than the reference level, the comparator 184 causes the digital control signal coupled to the selectors 162 and 163 to go low. When the former is lower than the latter, the comparator 184 causes the control signal to go high.

Specifically, the microphone 17 is made up of a microphone and a sampling circuit for sampling the output of the microphone, although not shown in the figure. The sampling circuit may be separately provided. The adder 181 sequentially adds the noise signal levels sampled by the sampling circuit. The mean unit 182 divides the sum of the noise signal levels by the number of times of sampling so as to produce a mean noise signal level.

The reference noise signal level stored in the storage 183 corresponds to a noise level in urban areas which would make the received speech hard to hear if the speech were passed through the LPF 161L. When the mean noise signal level is higher than the reference level, the speech band control circuit 18 determines that the noise around the telephone is too loud for the received speech to be heard if it is passed through the LPF 161L, thereby causing the control signal to go low. Conversely, when the former is lower than the latter, the circuit 18 determines that the noise is low enough for the received speech to be heard even if it is passed through the LPF 161L. As a result, the circuit 18 causes the control signal to go high.

When the control signal from the speech band control circuit 18 goes low, the selectors 162 and 163 select the HPF 161H. In this condition, the HPF 161H filters out the low frequency component of the signal coming in from the radio section 15 via the selector 162. The resulting voice from the receiver 13 is easy to hear despite the surrounding noise, although the quality is not improved. On the other hand, when the control signal goes high, the selectors 162 and 163 select the LPF 161L. The LPF 161L filters out the high frequency component of the incoming signal. Hence, the voice from the receiver 13 sounds soft, i.e., the quality is improved. Such voice is easily heard because the surrounding noise level is low.

As stated above, the illustrative embodiment automatically selects the high frequency component or the low frequency component, depending on the level of noise around the telephone. Specifically, when the noise is loud, the received speech signal is made easy to hear for sure communication although the speech quality is not improved. When the noise is not so loud, the speech quality is improved for easy communication. This makes it needless for the user to adjust the frequency characteristic of a received speech by hand. The telephone is, therefore, easy and convenient to operate and obviates the momentary interruption of communication due to inadequate operation.

The microphone 17 is provided on the rear of the casing 11, i.e., on the opposite side to the transmitter 12. Hence, the voice of the user, speaking on the telephone, is substantially prevented from being input to the microphone 17 as noise. Preferably, the microphone 17 should be located at a position remote from the transmitter 12, e.g., at the rear of the receiver 13.

Assume that the transmitter and receiver are implemented as a hands-free adapter separate from a telephone casing. Then, the microphone 17 mounted on the casing will be sufficiently spaced apart from the transmitter and receiver and little susceptible to the user's voice.

Generally, how easily a received voice can be heard depends on person. In the light of this, a level adjuster may be connected between the storage 183 and the comparator 184. Then, the user can adjust the reference noise signal level to be input to the comparator 184 beforehand in matching relation to the auditory level particular to the user. In response, the telephone selects either the high frequency component or the low frequency component of the received speech signal by using the adjusted reference or threshold level, so that communication can be held under a condition matching the user's auditory level. Further, the speech band switching section 16 may be constructed such that the user can adjust the pass bands of the HPF 161H and LPF 161L to the user's taste.

Figure 2:
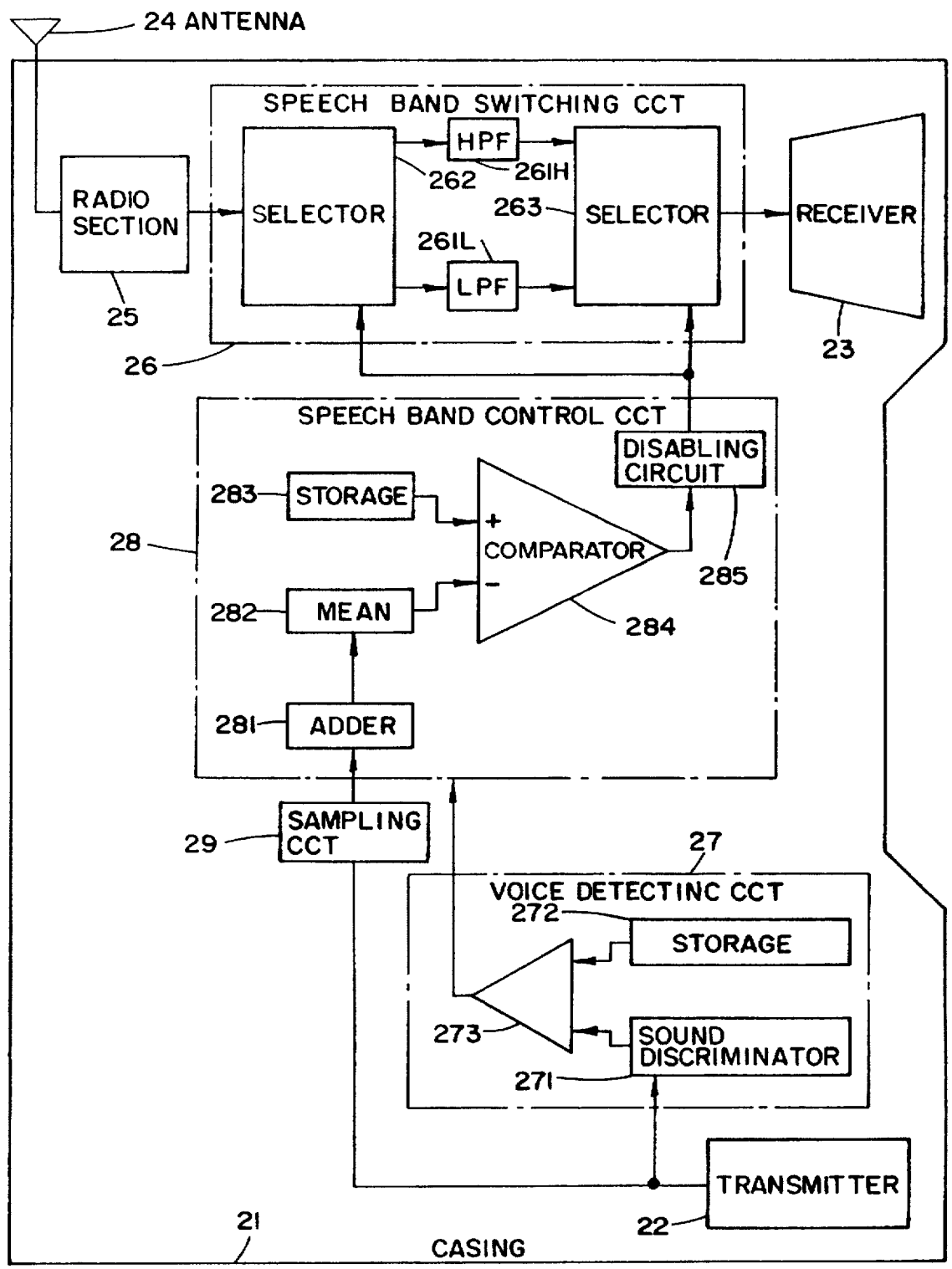
FIG. 2 is a schematic block diagram showing essential part of an alternative embodiment of the present invention.

Referring to FIG. 2, an alternative embodiment of the present invention will be described. FIG. 2, like FIG. 1, shows only part of the telephone relevant to the understanding of the present invention. Briefly, the alternative embodiment assigns the function of the microphone 17, FIG. 1, to a transmitter. As shown, the telephone has a casing 21, and a transmitter 22 and a receiver 23 mounted on the casing 21. An antenna is connected to a radio section 25 which is, in turn, connected to the receiver 23 via a speech band switching circuit 26. A signal come in through the antenna 24 and demodulated by the radio section 25 is applied to the speech band switching circuit 26. In response, the switching circuit 26 selects either the high frequency component or the low frequency component of the speech signal, as in the previous embodiment.

Specifically, the speech band switching circuit 26 has a plurality of parallel band-pass filters 261 connected to selectors 262 and 263 at opposite ends thereof. The selectors 262 and 263 select one of the filters 261 and connect it to the radio section 25 and receiver 23. The filters 261 are implemented as an HPF 261H and an LPF 261L. When the selectors 262 and 263 select the HPF 261H, the HPF 261H enhances the high frequency component of the output of the radio section 25. As a result, voice which is easy to hear is output from the receiver 23. When the selectors 262 and 263 select the LPF 261L, the low frequency component of the output of the radio section 25 is enhanced to improve the speech quality.

A speech band control circuit 28 delivers a digital control signal to the selectors 262 and 263. The selectors 262 and 263 select the HPF 261H when the control signal goes low or selects the LPF 261L when it goes high.

The speech band control circuit 28, similar to the circuit 18 of FIG. 1, and a voice detecting circuit 27 are connected to the transmitter 22. The voice detecting circuit 27 determines whether or not the user's voice has been input to the transmitter 22. The speech band control circuit 28 generates the above-mentioned control signal for operating the speech band switching circuit 26. A sampling circuit 29 samples noise signal levels sequentially detected at the transmitter 22. The speech band control circuit 28 has an adder 281, a mean unit 282, a storage 283, and a comparator 284. The adder 281 adds the consecutive outputs of the sampling circuit 29. The mean unit 282 divides the sum of the noise signal levels by time to produce a mean noise signal level. The comparator 283 compares the mean noise signal level with a predetermined reference noise signal level stored in the storage 283. The comparator 284 generages the control signal which goes low if the mean signal level is higher than the reference signal level or goes high if the former is lower than the latter.

The voice detecting circuit 27 has a sound discriminator 271 for determining the level of sound input to the transmitter 22, a storage 272 storing a predetermined signal level, and a comparator 273 for comparing the detected sound level with the stored or reference signal level. When the sound level input to the transmitter is higher than the reference signal level, the circuit 27 determines that the user's voice has been input to the transmitter 22. If the former is lower than the latter, the circuit 27 determines that noise has been input to the transmitter 22. Because voice has a particular spectrum while noise has a flat spectrum, the voice detecting circuit 27 may be implemented as a circuit capable of discriminating voice and noise on the basis of a spectrum. Such an alternative circuit is well known in the speech recognition, synthesis and analysis art and will not be described specifically.

The output of the voice detecting circuit 27, indicating whether the input sound is voice or noise, is applied to a disabling circuit 285 in the band control circuit 28. The disabling circuit 285 may include a switch responsive to the voice detecting circuit output for preventing the comparator 284 supplying the control signal and a holding circuit for holding the control signal when the supply of the control signal is stopped. This output disenables the control circuit 28 when the input sound is voice or enables it when the sound is noise. When the control circuit 28 is disenabled by the output of the voice detecting circuit 27, the speech band switching circuit 26 continuously selects one of the HPF 261H and LPF 261L which it has selected immediately before. At this instant, which of the HPF 261H and LPF 261L is selected matters little because no voice is usually output from the receiver 23 when voice is input to the transmitter 22. When the control circuit 28 is enabled, meaning that noise around the telephone is input to the transmitter 22, the control circuit 28 controls the speech band switching circuit 26 in the same manner as in the previous embodiment. Specifically, the switching circuit 26 automatically selects the HPF 261H when the noise is loud or selects the LPF 261L if otherwise.

As stated above, this embodiment also automatically selects the high frequency component or the low frequency component, depending on the level of noise around the telephone. Specifically, when the noise is loud, the received speech signal is made easy to hear for sure communication although the speech quality is not improved. When the noise is not so loud, the speech quality is improved for easy communication. This makes it needless for the user to adjust the frequency characteristic of received voice by hand. The telephone is, therefore, easy and convenient to operate and obviates the momentary interruption of communication due to inadequate operation. In addition, because the transmitter 22 plays the role of a noise microphone as the same time, it is not necessary to add a microphone to an existing telephone. The telephone is, therefore, miniature and light weight. This embodiment, like the previous embodiment, is practicable even with a telephone having a hands-free adapter.

In summary, it will be seen that the present invention provides a telephone capable of sensing the level of noise around it, comparing it with a predetermined signal level, and switching the frequency characteristic of a received speech on the basis of the noise level. Therefore, the telephone can automatically select the high frequency component or the low frequency component of a received speech on the basis of the noise level. When the noise level is high, the telephone ensures communication by promoting ease of hearing while sacrificing speech quality. When the noise level is low, the telephone ensures easy communication by improving speech quality. More specifically, in a high noise level environment, the telephone selects a high-pass filter to filter out a low frequency component, thereby rendering a received speech easy to hear. In a low noise level environment, the telephone selects a low-pass filter so as to filter out a high frequency component and thereby causes a received speech to sound soft, i.e., improves speech quality. This makes it needless for the user to adjust the frequency characteristic of a received speech by hand. As a result, the telephone is easy and convenient to operate and is free from the momentary shut-off of reception due to erroenous operation.

Further, the telephone of the present invention determines whether or not sound input to a transmitter is voice or noise on the basis of the level of the sound, and selectively enables or disenables a speech band control circuit. The transmitter, therefore, plays the role of a noise microphone at the same time and makes it needless to add an extra microphone to the telephone. This also reduces the size and weight of the telephone.

What is claimed is:

1. A mobile telephone comprising:

speech band switching means for selectively providing a received speech signal with one of a plurality of frequency characteristics;

sensing means for sensing a noise level surrounding the telephone; and control means for comparing the noise level with a predetermined reference level, and controlling said speech band switching means in response to the comparison; said speech band switching means including a high-pass filter, a low-pass filter, and selectors for selecting said high-pass filter when the noise level is higher than said predetermined reference level, and for selecting said low-pass filter when said noise level is lower than said predetermined reference level.

2. A telephone as claimed in claim 1, wherein said control means comprises:

an adder for adding noise signal levels sequentially sensed by said sensing means;

a mean unit for dividing a sum of said noise signal levels by real time to produce a mean value; and a comparator for comparing said mean value with said predetermined reference level.

3. A mobile telephone comprising:

a plurality of band-pass filters each for providing a received speech signal with a particular frequency characteristic;

selectors for selecting one of said plurality of band-pass filters at a time;

a microphone mounted on a casing of said telephone for sensing noise around said telephone;

a storage means for storing a predetermined signal level; and a comparator for comparing a noise level sensed by said microphone with said signal level stored in said storage means;

wherein said selectors are operated in response to an output of said comparator.

4. A mobile telephone comprising:

a plurality of band-pass filters each for providing a received speech signal with a particular frequency characteristic;

selectors for selecting one of said plurality of band-pass filters at a time;

a transmitter;

transmission detection means for determining, based upon a sound level input to said transmitter whether a speech signal to be sent has been input to said transmitter;

a storage circuit for storing a predetermined signal level; and a comparator for comparing said sound level with said predetermined signal level stored in said storage circuit;

wherein said selectors are operated in response to an output of said transmission detection means and an output of said comparator.

* * * * *